Nov. 25, 1941.    A. C. ANDERSEN    2,263,834
ADJUSTABLE SEAT FOR AUTOMOTIVE VEHICLES
Filed Oct. 10, 1938    3 Sheets-Sheet 1

INVENTOR.
Andrew Christian Andersen
BY
Barnes, Kiselle, Laughlin & Raisch
ATTORNEYS Nov. 25, 1941.  A. C. ANDERSEN  2,263,834
ADJUSTABLE SEAT FOR AUTOMOTIVE VEHICLES
Filed Oct. 10, 1938  3 Sheets-Sheet 2

INVENTOR.
Andrew Christian Andersen
BY
Barnes, Kisselle, Laughlin & Raisch
ATTORNEYS Nov. 25, 1941.  A. C. ANDERSEN  2,263,834
ADJUSTABLE SEAT FOR AUTOMOTIVE VEHICLES
Filed Oct. 10, 1938  3 Sheets-Sheet 3
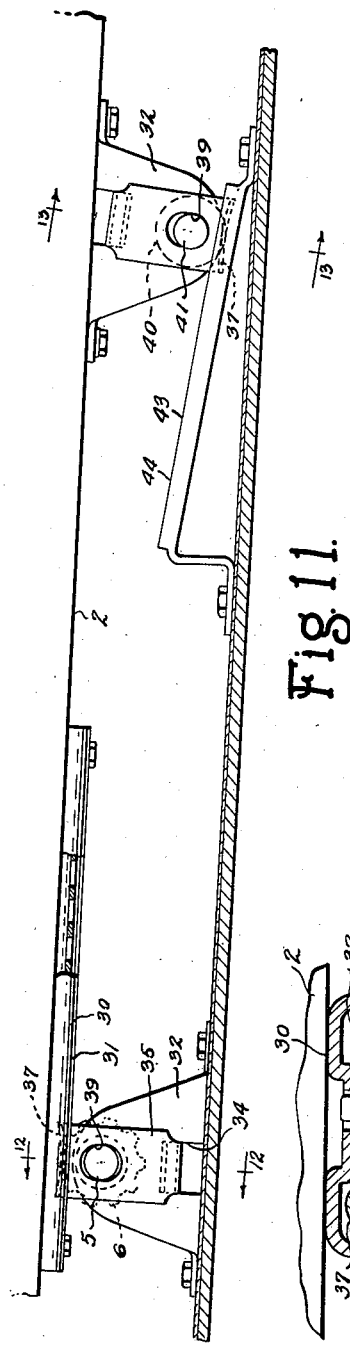
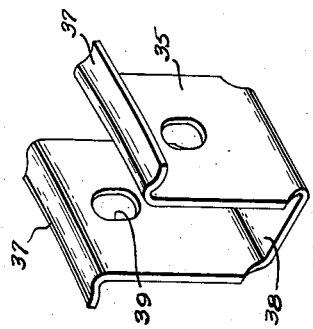
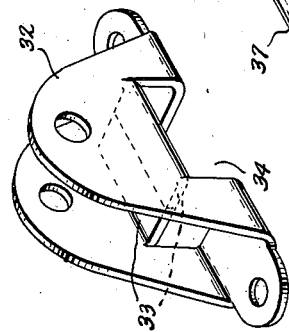
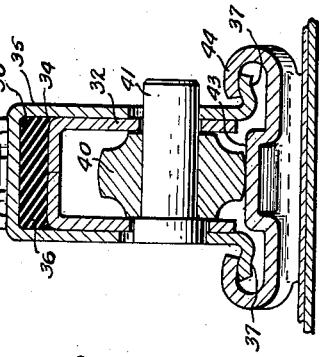
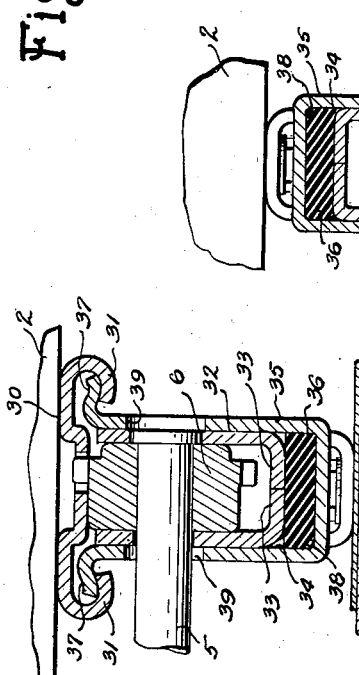
INVENTOR.
Andrew Chistian Andersen
BY
Barnes, Kisselle, Laughlin & Raisch
ATTORNEYS Patented Nov. 25, 1941

2,263,834

UNITED STATES PATENT OFFICE 2,263,834

ADJUSTABLE SEAT FOR AUTOMOTIVE VEHICLES

Andrew Christian Andersen, Detroit, Mich., assignor to Ternstedt Manufacturing Company, Detroit, Mich., a corporation of Michigan Application October 10, 1938, Serial No. 234,123

5 Claims. (Cl. 155—14)

This invention relates to an adjustable seat for an automotive vehicle and more particularly to a hold-down arrangement for preventing rattling of the seat adjuster.

It has been common practice to adjustably mount automotive vehicle seats upon the floor of the vehicle body by means of an adjuster in the form of a track and a slide or roller for traveling along the track. The track is secured either to the bottom frame of the seat or to the vehicle floor and the slide or roller mounted on the other of these members. The problem which is ever present in this type of seat adjuster is that of preventing rattles, particularly between the track and its cooperating slide or roller. At present the tightening or adjustment of the hold-down device is left to the judgment or skill of the workman assembling the adjuster. In view of this one or the other of two defects are present in the hold-down device used for holding the slide or roller upon the track, to wit: either the hold-down device holds the slide or roller so tightly against the track that adjustment of the roller along the track can only be achieved with difficulty due to the friction set up by the hold-down device or else the hold-down device does not hold the slide or roller tightly against the track and rattles inevitably result.

It is an object of this invention to produce a hold-down arrangement for a seat adjuster which will eliminate the above-mentioned personal factor in assembly and overcome the above-mentioned disadvantages so that the seat may be easily adjusted and so that the seat adjuster will remain free from rattling and chattering during the operation of the vehicle whether the seat is occupied or not.

It is also an object of this invention to produce a seat adjuster having a hold-down device which during assembly will automatically draw the slide or roller against the track with the proper pressure to prevent rattles and permit easy seat adjustment without requiring the workman assembling the adjuster to guess or determine the pressure with which the slide or roller is held against the track.

In the drawings:

Fig. 11 is a fragmentary side elevation of a seat and seat adjuster showing a modified form of hold-down device.

Figure 1:
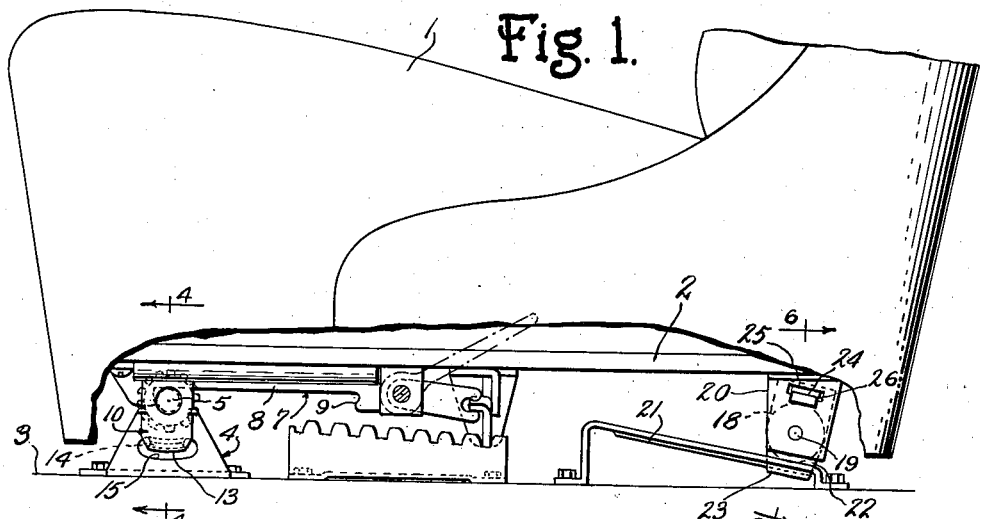
Fig. 1 is a side elevation showing the seat supported upon the floor of the vehicle by the seat adjuster.
Figure 2:
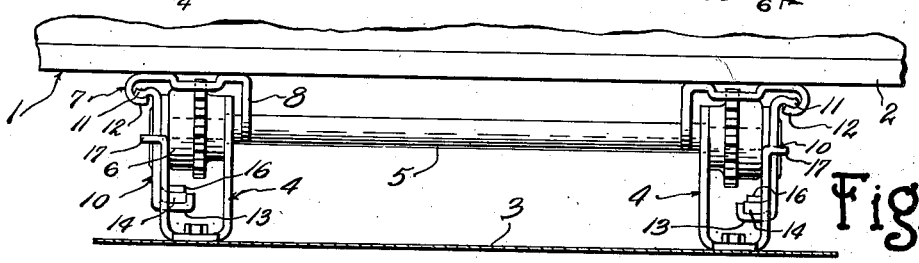
Fig. 2 is a fragmentary front elevation of the seat cushion and adjuster.
Figure 3:
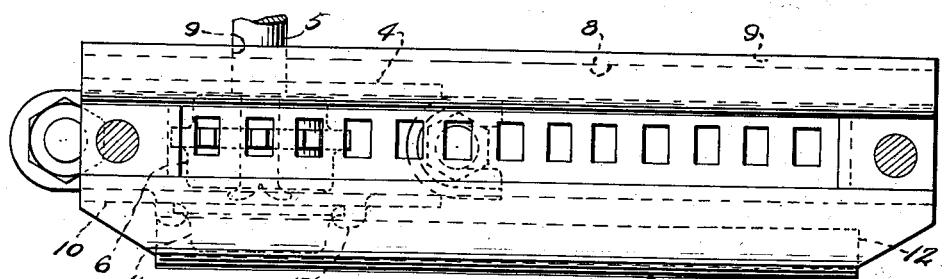
Fig. 3 is a detail view of the front track and roller.

Figs. 12 and 13 are sections along the lines 12—12 and 13—13 of Fig. 11.

Figs. 14 and 15 show details of the modified form of the hold-down bracket.

Referring more particularly to the drawings there is shown a seat 1 having a bottom frame 2. The floor of the vehicle body is referenced 3. The seat is supported at the front by an adjuster comprising a pair of stamped metal support members 4 which are bolted or otherwise secured to the floor 3. The support members 4 are U shaped in vertical cross section and rotatably support a shaft 5 having a combination equalizing gear and support roller 6 at each end. The combination gear and roller members 6 are fixed to the end of the shaft 5 and mounted between the side walls of the supports 4. A pair of combination track and rack members 7 are fixed to the bottom frame 2. The rack portions of the members 7 mesh with the gears and the track portion rides upon the roller portion of the combination gear and roller members 6. The track members 7 each have a depending flange 8 provided with an abutment 9 at each end. The seat can be adjusted forwardly and rearwardly between the abutments 9. One or the other of the abutments 9 abut the shaft 5 to arrest either the forward or rearward adjustment of the seat.

The tracks 7 are held down upon the rollers 6 by the hold-down bracket 10. The bracket 10 has an outwardly turned flange 11 along its upper edge which rests upon the downwardly and inwardly turned flange 12 of the track 7. The bracket 10 is provided with an inwardly turned L shaped flange 13 along its lower edge which serves as a seat for a cushion 14 of any suitable resilient material such as rubber. The flange 13 of the bracket 10 projects through an opening 15 in the support 4. The support 4 is provided with an inwardly turned flange 16 along the upper edge of the opening 15. The support 4 is also provided with a pair of outwardly turned hooked lugs 17 for guiding and securing the hold-down bracket 10 to the support 4.

Figure 4:
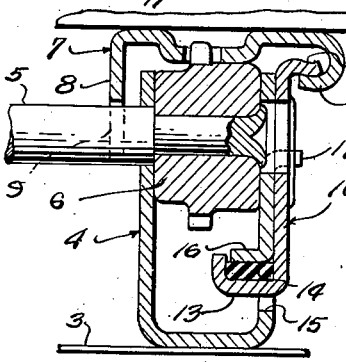
Fig. 4 is a section along the line 4—4 of Fig. 1.
Figure 5:
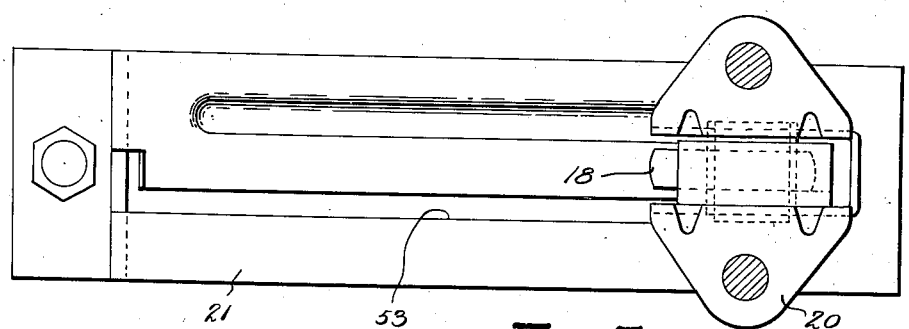
Fig. 5 is a detail of the rear roller and inclined trackway.
Figure 6:
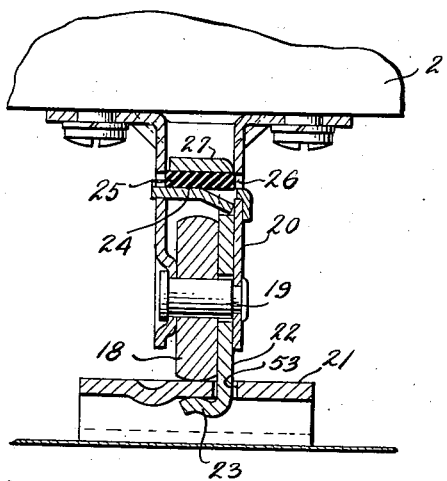
Fig. 6 is a section along the line 6—6 of Fig. 1.
Figure 7:
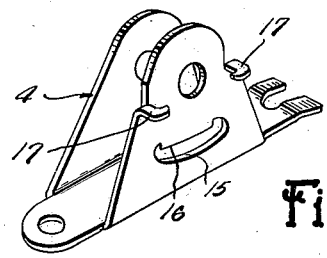
Figs. 7 through 10 are details of the principal form of the hold-down device.
Figure 9:
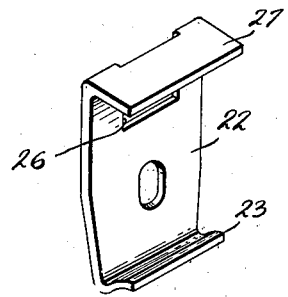
Figure 8:
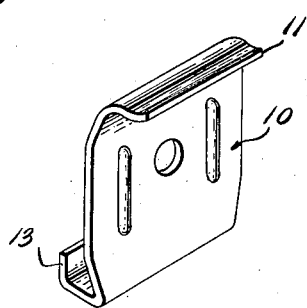

In assembly the equalizing shaft 5 and combination gear and roller members 6 are journaled in the support members 4 and the hold-down brackets 10 with their rubber blocks 14 mounted upon the supports 4, as shown in Fig. 4. This sub-assembly is bolted to the floor. Thereafter each combination track and rack member 7 is positioned upon and meshed with the combination gear and roller member 6 and the flange 11 of the hold-down bracket 10 introduced in to the end of the track 7 above the flange 12 thereby automatically compressing the rubber block 14 the correct amount which determines the amount of pressure under which the hold-down bracket 10, acting through flanges 11 and 12, holds the track 7 down upon the roller 6. The amount of pressure with which the track is held down upon the roller is determined and the size of the parts including the hold-down arrangement and the rubber block determined before the workman assembles the track and hold-down arrangement so that correct compression of the block 14 is automatically obtained by assembly and the personal judgment of the assembly workman as to what constitutes the proper compression of the rubber block 14 is eliminated. In adjustment of the seat the tracks 7, of course, roll upon the rollers 6 and the flange 12 slides along the hold-down flange 11.

Figure 10:
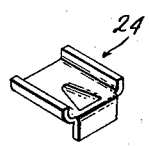

The seat is supported at the rear by means of rollers 18 journaled upon pins 19 which are riveted to support brackets 20. The support brackets 20 are bolted to the seat bottom 2. The rollers 18 roll upon inclined trackways 21. Each roller 18 is held upon the track 21 by a hold-down bracket 22 having a flange 23 which slidably engages the underside of the trackway 21. The trackway 21 is provided with a slot 53 for the hold-down bracket 22 as the seat is adjusted forwardly and rearwardly. A seat 24, Fig. 10, for a block of rubber 25 is provided in the form of a stamping carried by the support 20. The hold-down bracket 22 is provided with an opening 26 for the seat 24 and with an inwardly turned flange 27 which contacts the upper face of the rubber block 25. As in the hold-down arrangement above described, the rubber block 25 is automatically placed under the proper compression when each roller 18 is positioned upon the track 21 and the hold-down bracket 22 introduced into the slot 53 with the flange 23 slidably engaging the under face of the track 21.

In Figs. 11 through 15 there is shown a modified form of the hold-down device which differs from the principal form of the invention primarily in that the track and hold-down bracket are provided with two pair of cooperating hold-down flanges instead of a single pair of hold-down flanges. In this form of the invention the combination track and rack member 30 is provided along each longitudinal edge with downwardly and inwardly turned flanges 31. The support for the equalizing shaft 5 and combination gear and roller 6 takes the form of a stamping 32, Fig. 14. Lugs 33 are struck inwardly from the side walls of the support 32 thus providing an opening 34 for reception of the hold-down bracket 35 and rubber block 36. The hold-down bracket 35 is a U shaped stamping provided with a pair of outwardly turned flanges 37.

In assembly the rubber block 36 is positioned upon the bottom 38 of the bracket 35 and the bracket 35 slid over the support 32 so that the rubber block 36 is held between the seat 38 and the inwardly turned lugs 33. Thereafter the shaft 5 is passed through the opening 39 in the hold-down bracket 35 and journaled with the combination gear and roller 6 in the support 32. Then, as in the principal form of the invention, this subassembly is secured to the floor. Thereafter each track and rack member 30 is positioned upon and meshed with the roller gear members 6 and the flanges 37 of the hold-down member introduced into the ends of the track above the flanges 31 thus automatically compressing the rubber block 36 the correct amount as above described.

The rear of the seat is supported upon rollers 40 carried by pins 41 which are journaled in an inverted support bracket 32. The support bracket 32 is bolted to the seat bottom frame 2. The rollers 40 roll upon inclined trackways 43 which are provided along each longitudinal edge with upwardly and inwardly turned flanges 44 which slidably interengage the flanges 37 of the inverted hold-down member 35. Here again the rubber block 36 is compressed the correct amount by the introduction of the flanges 37 in the track 43 beneath the flanges 44.

I claim:

1. In a seat adjuster for a vehicle seat the combination comprising cooperating upper and lower support members, the upper of which is adapted to be secured to the seat and the lower of which is adapted to be secured to the vehicle floor with the upper member resting upon and movable relative to the lower member in the adjustment of the seat, one of said support members having a flange, a hold-down member of Z section having one end slidably interengaged with the flange on the support member and the other end interengaged with the other support member, means securing the said hold-down member to the latter support member for up and down movement, and resilient means held in compression between the latter end of the Z section hold-down member and the latter support member whereby the hold-down member and flange on the support member cooperate to hold the support members against rattling.

2. In a seat adjuster for a vehicle seat the combination comprising cooperating upper and lower support members, the upper of which is adapted to be secured to the seat and the lower of which is adapted to be secured to the vehicle floor with the upper member resting upon and movable relative to the lower member in the adjustment of the seat, one of said support members having a flange, a hold-down member having at one end a flange slidably engaged with the flange on the support member, means securing the said hold-down member to the other support member for up and down movement, a seat on the other end of the hold-down member and an abutment on its respective support member, and resilient means held in compression between the seat on the hold-down member and the abutment on its respective support member for drawing the flange on the hold-down member against the flange on the support member whereby the support members are held against rattling.

3. In a seat adjuster for a vehicle seat the combination comprising cooperating upper and lower support members, the upper of which is adapted to be secured to the seat and the lower of which is adapted to be secured to the vehicle floor with the upper member resting upon and movable relative to the lower member in the adjustment of the seat, one of said support members having a flange, a hold-down member having at one end a flange slidably engaged with the flange on the support member, means securing the said hold-down member to the other support member for up and down movement, a seat on the other end of the hold-down member and an abutment on its respective support member, and a rubber block held in compression between the seat on the hold-down member and the abutment on its respective support member for drawing the flange on the hold-down member against the flange on the support member whereby the support members are held against rattling.

4. In a seat adjuster for a vehicle seat the combination comprising cooperating upper and lower support members, the upper of which is adapted to be secured to the seat and the lower of which is adapted to be secured to the floor, with the upper member resting upon and movable relative to the lower member in the adjustment of the seat, a hold-down member slidably mounted on one of said support members for movement in a vertical direction relative to said support member, said hold-down member slidably engaging said other support member during adjustment of said seat, and resilient means held in compression between the hold-down member and the said support member upon which the hold-down member is mounted whereby the hold-down member acts to hold the support members against rattling.

5. In a seat adjuster for a vehicle seat the combination comprising cooperating upper and lower support members, the upper of which is adapted to be secured to the seat and the lower of which is adapted to be secured to the floor, with the upper member resting upon and movable relative to the lower member in the adjustment of the seat, a unitary hold-down member slidably mounted on one of said support members for movement as an integral unit in a vertical direction relative to said support member, said hold-down member slidably engaging said other support member during adjustment of said seat, and a resilient means held in compression between the unitary hold-down member and the said support member upon which the hold-down member is mounted whereby the unitary hold-down member acts to hold the support members against rattling.

ANDREW CHRISTIAN ANDERSEN.